(12) United States Patent
Maben

(10) Patent No.: US 12,110,115 B2
(45) Date of Patent: Oct. 8, 2024

(54) METHODS AND APPARATUS TO DIRECT VENTILATION OF VEHICLE OCCUPANTS

(71) Applicant: The Boeing Company, Chicago, IL (US)

(72) Inventor: Douglas D. Maben, Snohomish, WA (US)

(73) Assignee: The Boeing Company, Arlington, VA (US)

( * ) Notice: Subject to any disclaimer, the term of this patent is extended or adjusted under 35 U.S.C. 154(b) by 200 days.

(21) Appl. No.: 17/348,429

(22) Filed: Jun. 15, 2021

(65) Prior Publication Data

US 2021/0394909 A1 Dec. 23, 2021

Related U.S. Application Data

(60) Provisional application No. 63/041,604, filed on Jun. 19, 2020.

(51) Int. Cl.
*B64D 13/06* (2006.01)
*B64D 11/06* (2006.01)
*B64D 13/00* (2006.01)

(52) U.S. Cl.
CPC .............. *B64D 13/06* (2013.01); *B64D 11/06* (2013.01); *B64D 2013/003* (2013.01); *B64D 2013/0651* (2013.01)

(58) Field of Classification Search
CPC .. B64D 13/06; B64D 11/06; B64D 2013/003; B64D 2013/0651; B64D 11/0626; B64D 2013/0625; A62B 7/14; A62B 18/006; B60H 1/3414; B60H 1/34; A61M 16/06; A47C 7/74
See application file for complete search history.

(56) References Cited

U.S. PATENT DOCUMENTS

2004/0160092 A1 * 8/2004 Laib ................... B64D 11/0624
297/180.1
2005/0082390 A1 * 4/2005 Ferrono ............... B60H 1/3202
239/332
(Continued)

FOREIGN PATENT DOCUMENTS

CN 201123579 Y * 10/2008 ............. A47C 7/742
CN 103948256 A * 7/2014
(Continued)

OTHER PUBLICATIONS

English translation of CN-103948256-A, dated Dec. 5, 2023 (Year: 2023).*

(Continued)

*Primary Examiner* — Edelmira Bosques
*Assistant Examiner* — Brett Peterson Mallon
(74) *Attorney, Agent, or Firm* — HANLEY, FLIGHT & ZIMMERMAN, LLC

(57) ABSTRACT

Methods and apparatus to direct ventilation of vehicle occupants are disclosed. A disclosed example apparatus includes an air supply duct of a cabin of a vehicle, a manifold fluidly coupled to the air supply duct, the manifold to extend to occupant seats of the cabin, and nozzles fluidly coupled to the manifold, the nozzles to be positioned to face toward a front of a face of an occupant when the occupant occupies one of the occupant seats.

22 Claims, 6 Drawing Sheets

(56) References Cited

U.S. PATENT DOCUMENTS

| | | | | |
|---|---|---|---|---|
| 2010/0043794 A1* | 2/2010 | Saito | ................. | B64D 11/0632 |
| | | | | 128/204.22 |
| 2014/0179212 A1* | 6/2014 | Space | ................. | B60N 2/5635 |
| | | | | 454/76 |
| 2014/0306059 A1* | 10/2014 | Brown | ................. | F03G 7/0614 |
| | | | | 312/319.6 |
| 2018/0188166 A1 | 7/2018 | Zeller et al. | | |

FOREIGN PATENT DOCUMENTS

| | | |
|---|---|---|
| DE | 19534025 C1 | 11/1996 |
| EP | 2096033 A1 | 9/2009 |

OTHER PUBLICATIONS

English translation of CN-201123579-Y, dated May 8, 2023 (Year: 2024).*
European Patent Office, "Extended European Search Report," issued in connection with European Application No. 21168635.7, Sep. 10, 2021, 9 pages.

* cited by examiner

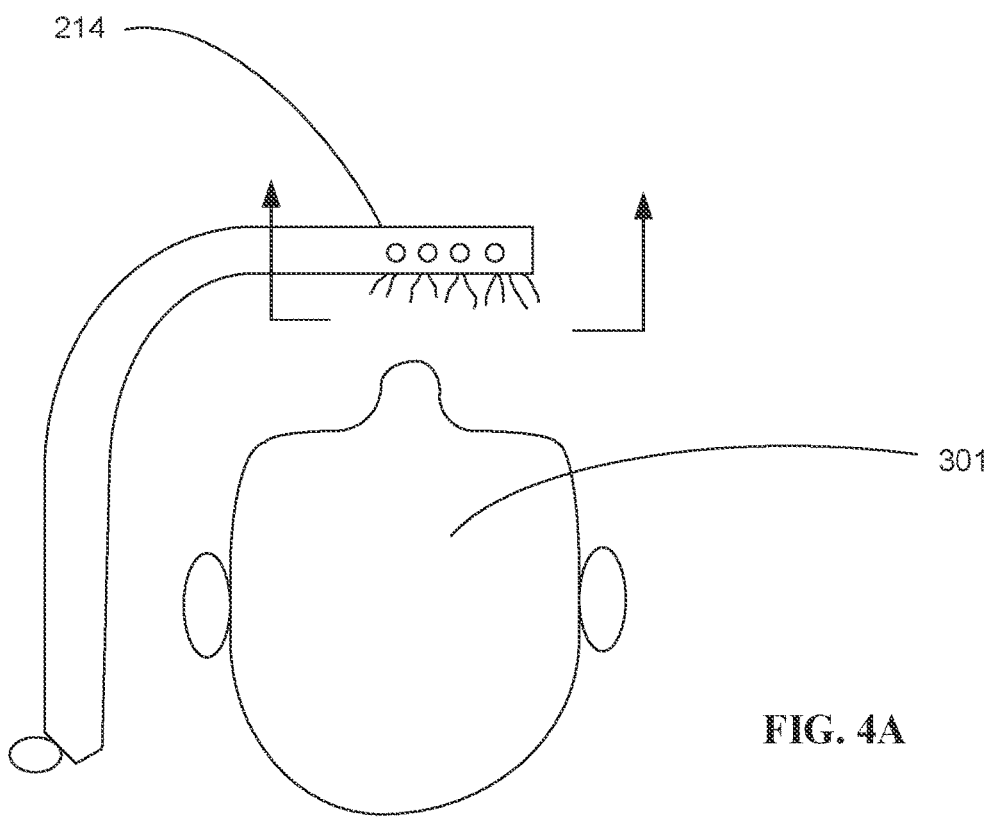
FIG. 4A
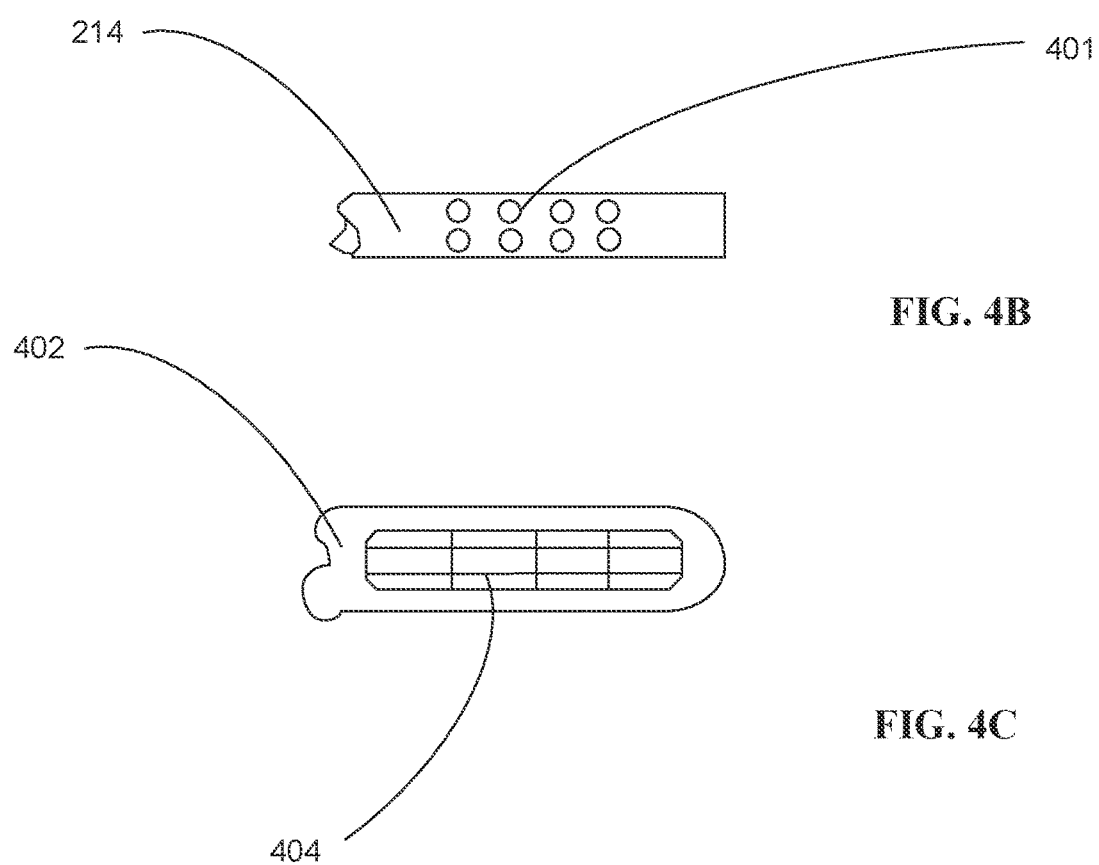
FIG. 4B
FIG. 4C

METHODS AND APPARATUS TO DIRECT VENTILATION OF VEHICLE OCCUPANTS

RELATED APPLICATION

This application claims the benefit of U.S. Provisional Patent Application No. 63/041,604, which was filed on Jun. 19, 2020. U.S. Patent Application Ser. No. 63/041,604 is hereby incorporated herein by reference in its entirety. Priority to U.S. Patent Application Ser. No. 63/041,604 is hereby claimed.

FIELD OF THE DISCLOSURE

This disclosure relates generally to vehicles and, more particularly, to methods and apparatus to direct ventilation of vehicle occupants.

BACKGROUND

Typically, a cabin air system (CAS) is implemented in an aircraft to provide clean, filtered air to occupants of the aircraft. Particularly, the CAS provides external air to a cabin of the aircraft while circulating air within the cabin. The resultant air flow pattern within the cabin can result in significant mixing of the air in the cabin. As a result, air expelled from an occupant can be circulated to other occupants, thereby increasing a risk for infection, etc.

SUMMARY

An example apparatus includes an air supply duct of a cabin of a vehicle, a manifold fluidly coupled to the air supply duct, the manifold to extend to occupant seats of the cabin, and nozzles fluidly coupled to the manifold, the nozzles to be positioned to face toward a front of a face of an occupant when the occupant occupies one of the occupant seats.

An example seat for use with a vehicle includes a manifold fluidly coupled to an air supply duct, a conduit fluidly coupled to the manifold, the conduit extending from the manifold and toward a headrest of the seat, and a nozzle fluidly coupled to the manifold, the nozzle to be positioned to face a front of a face of an occupant when the occupant occupies the seat.

An example method includes providing air to an air supply duct associated with a cabin of a vehicle, the air supply duct fluidly coupled to a manifold that extends to occupant seats of the cabin, and directing the air from the manifold to a nozzle that is positioned to face toward a front of a face of an occupant when the occupant occupies a respective one of the occupant seats.

An example method includes coupling a manifold to a seat of a cabin of a vehicle, the manifold to be fluidly coupled to an air supply duct associated with the cabin, fluidly coupling a nozzle to the manifold, and positioning the nozzle so that air from the air supply duct is directed toward a front of a face of an occupant when the occupant occupies the seat.

BRIEF DESCRIPTION OF THE DRAWINGS

FIGS. 4A-4C depict example nozzle types that can be implemented in examples disclosed herein.

Figure 1:
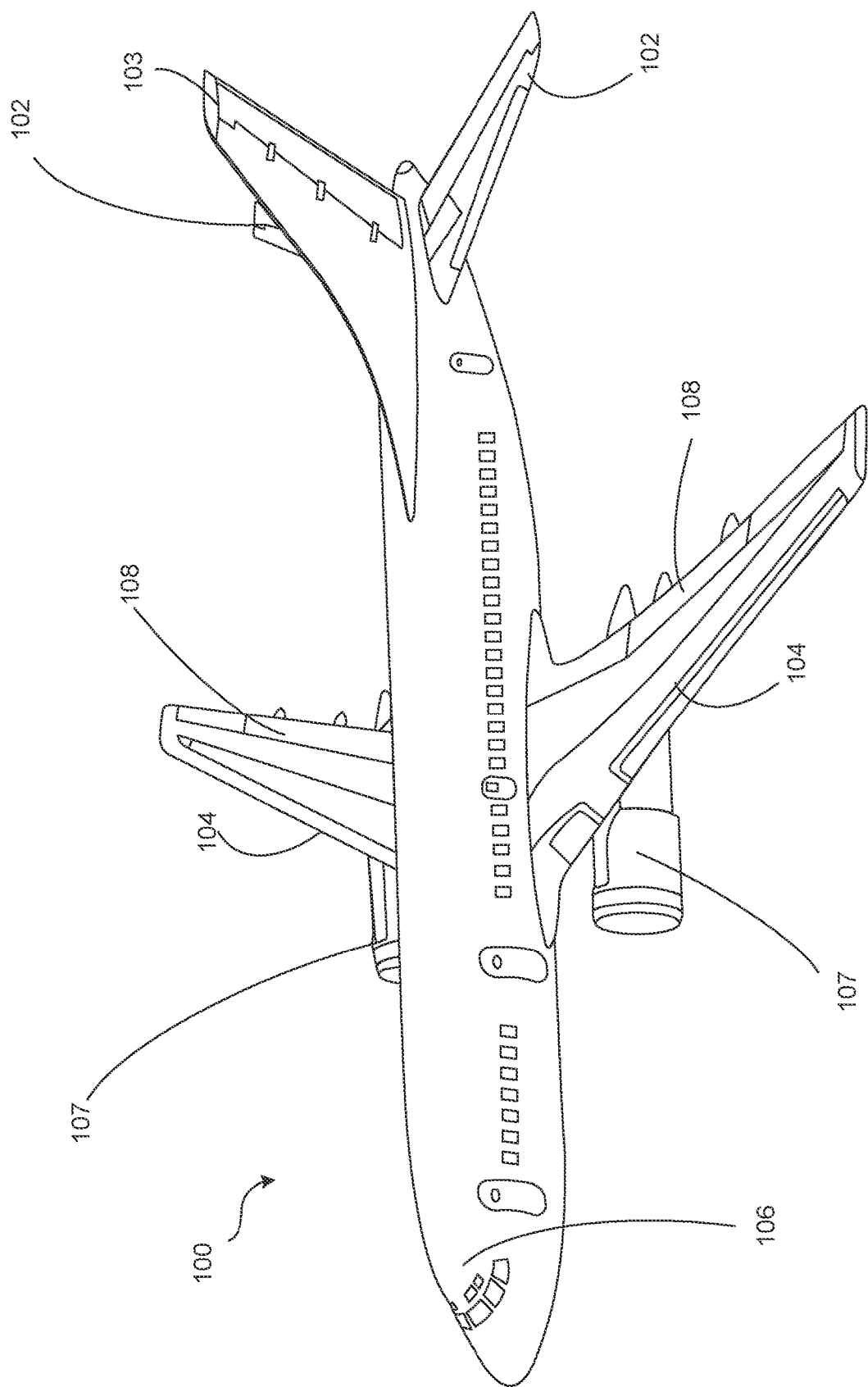
FIG. 1 illustrates an example aircraft in which examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this disclosure, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Methods and apparatus to direct ventilation of vehicle occupants are disclosed. Known aircraft implement a cabin air system (CAS) to provide clean, filtered air to occupants thereof. However, the air within the cabin can be significantly mixed when the cabin acts as a circulation volume. Particularly, air expelled from an occupant can be circulated to other occupants, thereby increasing a risk for infection, etc.

Example disclosed herein enable increased relative isolation of ventilation between occupants of a vehicle, which may be an aircraft, a spacecraft, a land vehicle, a boat, a submarine, a bus, etc. Accordingly, examples disclosed herein can reduce a probability of infection (e.g., due to viruses, bacteria, etc.) and/or the proliferation of undesirable odors throughout the vehicle. Alternatively, examples disclosed herein can be implemented in connection with buildings and other stationary structures in which people are placed in close proximity to one another.

Examples disclosed herein utilize a manifold that is fluidly coupled to an air supply duct. The manifold can extend between multiple occupant seats of a vehicle. In turn, at least one nozzle is fluidly coupled to the nozzle. The nozzle and/or an outlet of the nozzle is directed toward a front of a face of a seat occupant. For example, the nozzle can be positioned to the front of the occupant and mounted to a nozzle mount that exhibits curvature to orient the nozzle to face the front of the occupant. In particular, the nozzle can face toward a mouth and/or nose of the occupant.

In some examples, the nozzle mount includes multiple curved portions so that the nozzle faces the front of the occupant. In some examples, a conduit extends between the manifold and the nozzle and/or the nozzle mount. In some such examples, the conduit extends substantially vertically between a base of the seat and a headrest of the seat. In some examples, the nozzle mount is pivotable relative to a vertical height of the seat. Additionally or alternatively, the nozzle mount and/or the nozzle is pliable to adjust a position and/or orientation of the nozzle relative to the occupant.

FIG. 1 illustrates an example aircraft 100 in which examples disclosed herein can be implemented. In the illustrated example, the aircraft 100 includes horizontal tails 102, a vertical tail 103 and wings (e.g., fixed wings) 104 attached to a fuselage 106. The wings 104 of the illustrated example have engines 107, and control surfaces (e.g., flaps, ailerons, tabs, etc.) 108, some of which are located at a trailing edge or a leading edge of the wings 104. The control surfaces 108 may be displaced or adjusted (e.g., deflected, etc.) to provide lift during takeoff, landing and/or flight maneuvers.

In the illustrated example, occupants (e.g., passengers, flight crew, pilots, etc.) of the aircraft 100 are located in the fuselage 106 of the aircraft 100. In other words, the fuselage 106 provides a livable environment for the occupants of the aircraft 100. In this example, the aircraft 100 receives air external to the aircraft 100 and also circulates air within the fuselage 106. Examples disclosed herein enable relative isolation and/or separation of air circulated between the aforementioned occupants.

Figure 2:
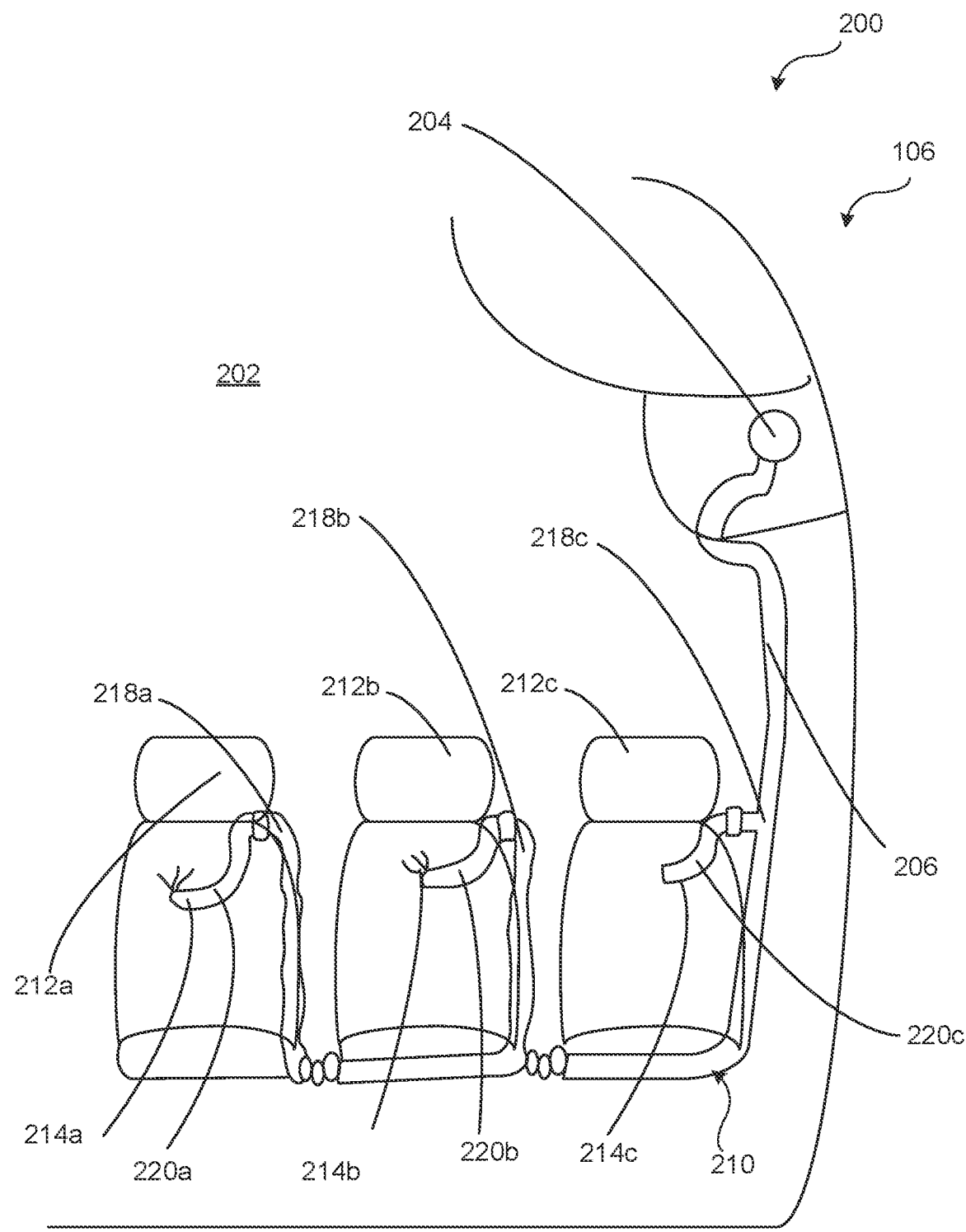
FIG. 2 illustrates an example ventilation system in accordance with teachings of this disclosure.

FIG. 2 illustrates an example ventilation system 200 in accordance with teachings of this disclosure. In the illustrated example of FIG. 2, a cabin 202 is shown within the fuselage 106. The ventilation system 200 includes an air supply duct 204 that is fluidly coupled to a distribution duct 206. In turn, the distribution duct 206 is fluidly coupled to a manifold (e.g., a seat manifold, a seat air distribution manifold, etc.) 210. The example manifold 210 extends across and/or through seats 212 (hereinafter seats 212a, 212b, 212c, etc.), all of which are arranged in a single row in this example. In other examples, however, the seats 212a, 212b, 212c can be positioned in different rows.

In the illustrated example, the manifold 210 is fluidly coupled to nozzles 214 (hereinafter nozzles 214a, 214b, 214c, etc.) via respective conduits (e.g., respective air conduits, fluid conduits, risers, etc.) 218 (hereinafter conduits 218a, 218b, 218c, etc.). Further, the nozzles 214a, 214b, 214c are supported and positioned by respective nozzle mounts (e.g., nozzle positioners, nozzle conduit, etc.) 220 (hereinafter nozzle mounts 220a, 220b, 220c, etc.).

To supply air to at least one occupant of the seats 212a, 212b, 212c, air is supplied to the air supply duct 204 and, in turn, the distribution duct 206. In turn, the air is then provided to the manifold 210 that extends across the seats 212a, 212b, 212c. The air from the manifold 210 then moves through the conduits 218a, 218b, 218c and exits from respective nozzles 214a, 214b, 214c. As a result, air is provided directly to occupants of the seats 212a, 212b, 212c. In this example, the nozzles 214a, 214b, 214c are oriented to face toward a front of a face of an occupant (e.g., a mouth and/or nose of the occupant). Particularly, the example nozzle mounts 220a, 220b, 220c are curved to direct air output from the nozzles 214a, 214b, 214c toward the front of the face of the occupant. In other words, the nozzles 214a, 214b, 214c are positioned in front of the seats 212a, 212b, 212c and curvature is implemented to face the nozzles 214a, 214b, 214c toward the occupant's face. In this example, the nozzles 214a, 214b, 214c are positioned directly in front of the respective occupant(s) and substantially horizontal (e.g., within 15 degrees of horizontal).

Figure 3:
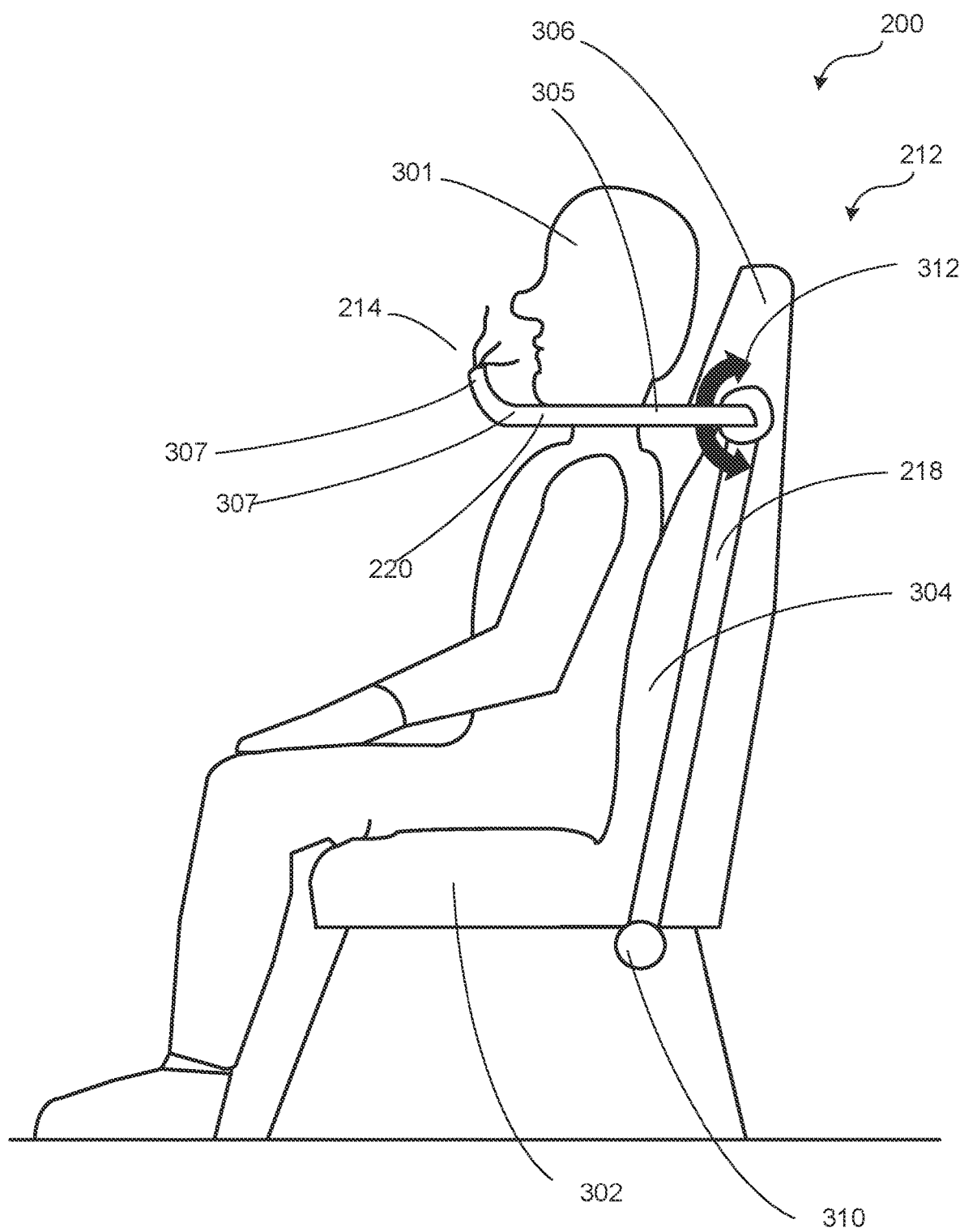
FIG. 3 illustrates an example seat implementation of the ventilation system shown in FIG. 2.

FIG. 3 illustrates an example seat implementation of the ventilation system 200 shown in FIG. 2. In this example, an occupant 301 is shown supported by the aforementioned seat 212, which includes a base (e.g., a seat bottom) 302, a seat back 304 and a headrest 306. As can be seen in the illustrated view of FIG. 3, the nozzle 214 is positioned in front of the occupant 301 and faces toward the occupant 301 in an area proximate a mouth and nose of the occupant 301. Further, nozzle mount 220 extends away from the headrest 306 and is curved to direct the air toward the occupant 301. In other words, the nozzle 214 is directed toward the occupant 301 in a manner similar to a microphone and/or headset microphone. In this example, the conduit 218 of the illustrated example extends substantially vertical with the seat back 304 and/or the seat 212.

To position the nozzle 214 in front of the occupant 301 and direct the nozzle 214 toward a front of the face of the occupant 301, the nozzle mount 220 and/or the nozzle 214 include an longitudinal extension 305 that extends toward the front of the seat 212, as well as curved portion(s) (e.g., arcuate portion(s)) 307 that orient the nozzle 214 toward the occupant 301. In other words, the curved portion(s) 307 in combination with the longitudinal extension 305 cause the nozzle 214 to face a front side of the occupant 301, thereby functioning in a similar manner to a microphone boom, for example. However, any appropriate geometry to direct the nozzle 214 to the front of the face of the occupant 301 can be implemented instead.

In some examples, nozzle 214 can be pivoted to adjust a height at which air is provided to the occupant 301. For example, the conduit 218 can pivot about a pivot 310, as generally indicated by a double arrow 312. Additionally or alternatively, the nozzle 214, the nozzle mount 220 and/or the conduit 218 are pliable (e.g., plastically deformable) to adjust a position and/or height at which the nozzle 214 provides the air to the occupant 301. In some examples, the nozzle 214 is integrated with the seat 212. In some examples, the nozzle 214 is moved and/or pivoted in response to a height adjustment of the seat 212 (e.g., via a linkage or cam mechanism, etc.).

FIGS. 4A-4C depict example nozzle types can be implemented in examples disclosed herein. Turning to FIG. 4A, a top view of the nozzle 214 and the occupant 301 is shown. As can be seen in FIG. 4A, the nozzle 214 extends across a width of the head of the occupant 301.

FIG. 4B is a detailed view of the nozzle 214. In this example, the nozzle 214 includes multiple apertures 401 that are spaced apart at equal intervals, thereby defining a grid pattern (e.g., a piccolo hole pattern). In this example, the apertures 401 all have equivalent diameters. However, in other examples, the apertures 401 may vary in size and/or spacing. For example, the size of the apertures 401 may gradually increase in a direction toward a center of the occupant 301.

FIG. 4C is a detailed view of an alternative example nozzle 402. In contrast to the example nozzle 214, the nozzle 402 exhibits a grill or grid-like opening with vanes 404. In some examples, the vanes 404 can be angled and/or adjusted by the occupant 301.

The example nozzle types described herein are only examples and any appropriate nozzle type can be implemented instead. For example, a converging nozzle, a diverging nozzle, dispersion nozzles, etc. can be implemented instead.

Figure 5:
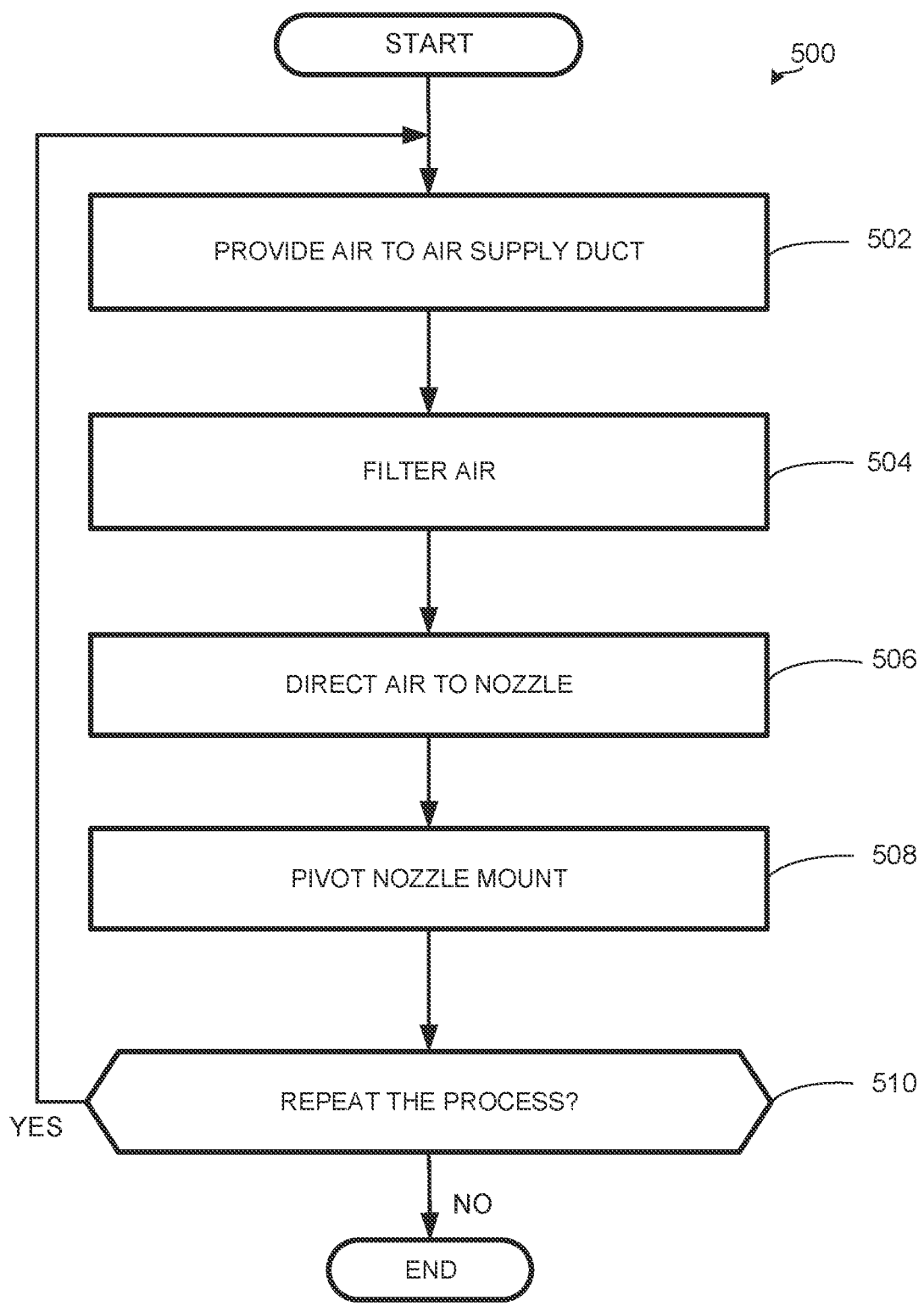
FIG. 5 is a flowchart representative of an example method to implement examples disclosed herein.

FIG. 5 is a flowchart representative of an example method 500 to implement examples disclosed herein. In this example, the ventilation system 200 is to be operated in the aircraft 100 during flight. In particular, the ventilation system 200 provides pressurized air to occupants of the fuselage 106.

At block 502, air is provided from an air supply source to the air supply duct 204.

At block 504, In some examples, the air is filtered (e.g., via a sub-micron filter, a HEPA filter, etc.). In particular, the air can be filtered as it is recirculated through the cabin 202.

At block 506, air is directed to the nozzle 214. In this example, the nozzle 214 is positioned and/or rotated to direct the air toward a front of a face of an occupant.

At block 508, in some examples, the nozzle mount 220 and/or the nozzle 214 is pivoted. For example, the nozzle 214 can be moved by an occupant so that the nozzle 214 is directed toward a mouth and/or nose of the occupant.

At block 510, it is determined whether to repeat the process. If the process is to be repeated (block 510), control of the process returns to block 502. Otherwise, the process ends. This determination may be based on whether ventilation is needed (e.g., whether the aircraft 100 is in flight).

Figure 6:
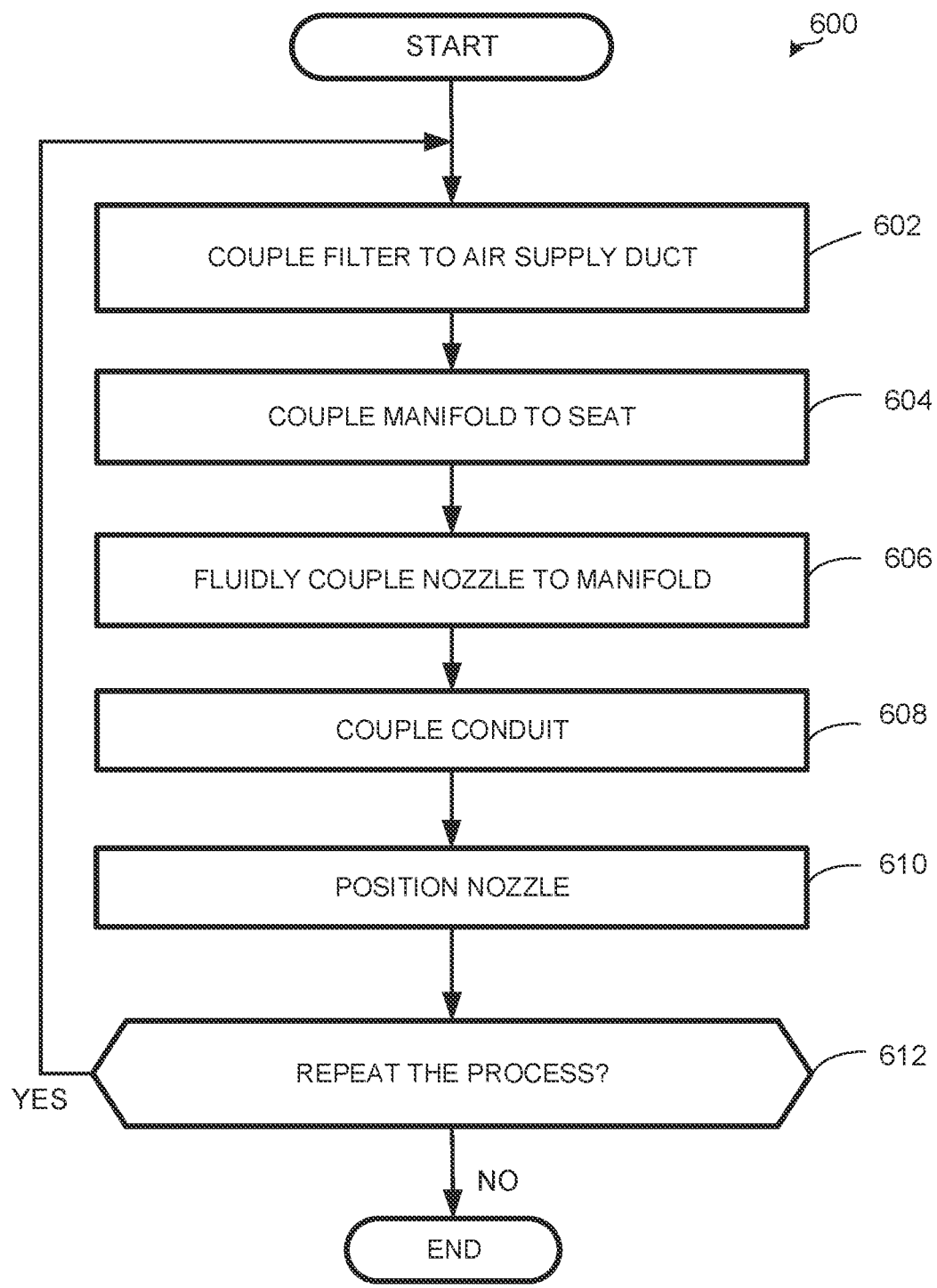
FIG. 6 is a flowchart representative of an example method to implement examples disclosed herein.

FIG. 6 is a flowchart representative of an example method 600 to implement examples disclosed herein. In this example, the ventilation system 200 is being installed and/or retrofitted onto the fuselage 106 of the aircraft 100.

At block 602, a filter is coupled to the air supply duct 204. The filter may be used to filter air provided to an occupant.

At block 604, the manifold 210 is coupled to the seat 212. For example, the manifold 210 may be positioned behind, through and/or across multiple ones of the seats 212. Additionally or alternatively, the manifold 210 extends under the seats 212. In some examples, the manifold 210 extends across multiple ones of the seats 212 in a single row of the aircraft 100.

At block 606, the nozzle 214 is fluidly coupled to the manifold 210. The nozzle 214 may be coupled to the manifold via a conduit or a tube (e.g., a flexible tube). In this particular example, the conduit 218 is coupled between (e.g., fluidly coupled between) the manifold 210 and the nozzle 214.

At block 608, in some examples, the conduit 218 is operatively coupled between the nozzle 214 and the manifold 210.

At block 610, the nozzle 214 is positioned toward a face of the occupant. In particular, the nozzle 214 is positioned to face toward a front of the occupant when the occupant is present.

At block 612, it is determined whether to repeat the process. If the process is to be repeated (block 612), control of the process returns to block 602. Otherwise, the process ends.

From the foregoing, it will be appreciated that example methods, apparatus and articles of manufacture have been disclosed that enable reduction (e.g., elimination) of infections (e.g., bacterial infections, viral infections, etc.) spreading between occupants of a vehicle, such as an aircraft. Further, examples disclosed herein can reduce the spread of pathogens (e.g., viruses, bacteria, etc.) between occupants of the vehicle.

Although certain example methods, apparatus and articles of manufacture have been disclosed herein, the scope of coverage of this disclosure is not limited thereto. On the contrary, this disclosure covers all methods, apparatus and articles of manufacture fairly falling within the scope of the claims of this disclosure. While examples disclosed herein are shown in the context of aircraft, examples disclosed herein can be implemented in any appropriate type of vehicle or building structure that necessitates ventilation.

Clause 1: An apparatus comprising an air supply duct of a cabin of a vehicle; manifold fluidly coupled to the air supply duct, the manifold to extend to occupant seats of the cabin; and nozzles fluidly coupled to the manifold, ones of the nozzles to be positioned to face toward a front of a face of a respective occupant when the occupant occupies one of the occupant seats.

Clause 2: The apparatus as defined in Clause 1, further including conduits extending between the manifold and the nozzles.

Clause 3: The apparatus as defined in Clause 2, wherein the conduits extend from bases of the occupant seats to headrests of the occupant seats.

Clause 4: The apparatus as defined in any of Clauses 1-3, further including nozzle mounts to support the respective nozzles, wherein the nozzle mounts are curved away from headrests of the occupant seats.

Clause 5: The apparatus as defined in any of Clauses 1-4, wherein the nozzle is to be directed toward a mouth or nose of the occupant.

Clause 6: The apparatus as defined in any of Clauses 1-5, wherein the manifold extends between ones of the occupant seats in a same row of the cabin.

Clause 7: A seat for use with a vehicle, the seat comprising a manifold fluidly coupled to an air supply duct; a conduit fluidly coupled to the manifold, the conduit extending from the manifold and toward a headrest of the seat; and a nozzle fluidly coupled to the manifold, the nozzle to be positioned to face a front of a face of an occupant when the occupant occupies the seat.

Clause 8: The seat as defined in Clause 7, further including a nozzle mount to support the nozzle, the nozzle mount curved away from the headrest.

Clause 9: The seat as defined in Clause 8, wherein the nozzle mount is pivotable along a vertical height.

Clause 10: The seat as defined in Clause 8, wherein the nozzle mount is pliable to adjust placement of the nozzle relative to the occupant.

Clause 11: The seat as defined in any of Clauses 7-10, wherein the conduit extends from a base of the seat to the headrest.

Clause 12: The seat as defined in any of Clauses 7-11, wherein the manifold extends across a rear of the seat.

Clause 13: A method comprising providing air to an air supply duct associated with a cabin of a vehicle, the air supply duct fluidly coupled to a manifold that extends to occupant seats of the cabin; and directing the air from the manifold to a nozzle that is positioned to face toward a front of a face of an occupant when the occupant occupies a respective one of the occupant seats.

Clause 14: The method as defined in Clause 13, further including pivoting a nozzle mount supporting the nozzle based on a height of an occupant.

Clause 15: The method as defined in Clause 13 or 14, wherein the manifold extends between ones of the occupant seats of a row of the cabin.

Clause 16: The method as defined in any of Clauses 13-15, further including filtering the air of the air supply duct.

Clause 17: A method comprising coupling a manifold to a seat of a cabin of a vehicle, the manifold to be fluidly coupled to an air supply duct associated with the cabin; fluidly coupling a nozzle to the manifold; and positioning the nozzle so that air from the air supply duct is directed toward a front of a face of an occupant when the occupant occupies the seat.

Clause 18: The method as defined in Clause 17, further including coupling a conduit between the manifold and the nozzle, the conduit to extend along a height of the seat.

Clause 19: The method as defined in Clause 17 or 18, further including coupling a filter to the air supply duct.

Clause 20: The method as defined in any of Clauses 17-19, wherein the manifold is positioned rear of the seat.

The following claims are hereby incorporated into this Detailed Description by this reference, with each claim standing on its own as a separate embodiment of the present disclosure.

What is claimed is:

1. An apparatus comprising:
    an air supply duct of a cabin of a vehicle;
    a manifold fluidly coupled to the air supply duct, the manifold to extend below occupant seats of a same row of the cabin;
    a tube fluidly coupled to the manifold, the tube having (i) an arcuate portion extending toward a front of one of the occupant seats and (ii) a straight portion configured to extend across a width of at least one of a mouth or a nose of a face of a respective occupant when the occupant occupies the occupant seat, the straight portion defining a nozzle area;
    nozzles extending across the nozzle area of the tube, the nozzles defined by respective apertures arranged across the straight portion of the tube; and
    a conduit to fluidly couple the manifold and the tube, the conduit extending from below the occupant seat to a rotational joint that rotatably couples the tube to the conduit, the rotational joint proximate a headrest of the occupant seat, the conduit external to a seat back of the occupant seat and pliable to adjust a position of the rotational joint and the tube.

2. The apparatus as defined in claim 1, wherein the conduit extends from a base to the headrest.

3. The apparatus as defined in claim 1, further including nozzle mounts to support the respective nozzles, wherein the nozzle mounts are curved away from the headrest.

4. The apparatus as defined in claim 1, further including vanes on or proximate the nozzles.

5. The apparatus as defined in claim 4, wherein the vanes are configured to be angled by the occupant.

6. The apparatus as defined in claim 1, wherein the nozzles include dispersion nozzles.

7. The apparatus as defined in claim 1, wherein the manifold is fluidly coupled to a distribution duct that extends from the manifold to the air supply duct above the occupant seats.

8. The apparatus as defined in claim 7, wherein the air supply duct includes a filter.

9. The apparatus as defined in claim 7, wherein the tube is a first tube, and wherein the distribution duct includes a second tube extending therefrom at a second rotational joint of a second one of the occupant seats, the second tube having (i) a second arcuate portion extending toward a front of the second occupant seat and (ii) a second straight portion configured to extend across a width of at least one of a mouth or a nose of a face of a respective occupant when the occupant occupies the second occupant seat, the second straight portion defining a second nozzle area.

10. The apparatus as defined in claim 1, wherein the rotational joint includes a swivel joint to rotatably couple the tube and the conduit.

11. A seat for use with a vehicle, the seat comprising:
    a tube proximate a headrest of the seat and fluidly coupled to a manifold that is fluidly coupled to an air supply duct, the tube having (i) an arcuate portion extending toward a front of the seat and (ii) a straight portion configured to extend across a width of at least one of a mouth or a nose of a face of a respective occupant when the occupant occupies the seat, the straight portion defining a nozzle area;
    nozzles extending across the nozzle area of the tube, the nozzles defined by respective apertures arranged across the straight portion of the tube; and
    a conduit to fluidly couple the manifold and the tube, the conduit extending from below the seat to a rotational joint that rotatably couples the tube to the conduit, the conduit external to a seat back of the seat and pliable to move the rotational joint to adjust a position of the tube.

12. The seat as defined in claim 11, further including a nozzle mount to support the nozzles, the nozzle mount curved away from the headrest.

13. The seat as defined in claim 12, wherein the nozzle mount is pivotable along a vertical height.

14. The seat as defined in claim 12, wherein the nozzle mount is pliable to adjust placement of the nozzles relative to the occupant.

15. The seat as defined in claim 11, wherein the conduit extends from a base of the seat to the headrest.

16. The seat as defined in claim 11, wherein the manifold extends across a rear of the seat.

17. A method comprising:
    providing air to an air supply duct associated with a cabin of a vehicle, the air supply duct fluidly coupled to a manifold that extends below occupant seats of a same row of the cabin, wherein a conduit is fluidly coupled to the manifold, the conduit extending from below one of the occupant seats to a rotational joint, the conduit external to a seat back of the seat and pliable to adjust a position of the rotational joint and a tube extending from the rotational joint, the tube rotatably coupled to the conduit at the rotational joint; and
    directing the air from the conduit to the tube, the tube having (i) an arcuate portion extending toward a front of the seat and (ii) a straight portion configured to extend across a width of at least one of a mouth or a nose of a face of a respective occupant when the occupant occupies the occupant seat, wherein the tube includes nozzles defined by respective apertures arranged across the straight portion of the tube.

18. The method as defined in claim 17, further including pivoting a nozzle mount supporting the nozzles based on a height of an occupant.

19. The method as defined in claim 17, further including filtering air from the air supply duct.

20. A method comprising:
coupling a manifold to a seat of a cabin of a vehicle, the manifold to be disposed below occupant seats of a same row of the cabin and fluidly coupled to an air supply duct associated with the cabin;
rotatably coupling a tube to a conduit to define a rotational joint therebetween, the conduit fluidly coupled to the manifold, the tube extending from a headrest of the seat, the tube having (i) an arcuate portion extending toward a front of the seat and (ii) a straight portion configured to extend across a width of at least one of a mouth or a nose of a face of a respective occupant when the occupant occupies the seat, wherein the tube includes nozzles defined by respective apertures arranged across the straight portion of the tube, the conduit extending from below the seat to the rotational joint, the conduit external to a seat back of the seat and pliable to adjust a position of the rotational joint; and
positioning at least one of the tube or the nozzles so that air from the air supply duct is directed toward a front of the face of the occupant when the occupant occupies the seat.

21. The method as defined in claim 20, further including coupling a filter to the air supply duct.

22. The method as defined in claim 20, wherein the manifold is positioned rearward of the seat.

* * * * *